(12) United States Patent
Berger (10) Patent No.: US 7,269,333 B2
(45) Date of Patent: *Sep. 11, 2007

(54) RECORDING ARRANGEMENT HAVING KEY WORD DETECTION MEANS

(75) Inventor: Gerald Berger, Maria Enzersdorf (AT)

(73) Assignee: Koninklijke Philips Electronics N. V., Eindhoven (NL)

( * ) Notice: Subject to any disclaimer, the term of this patent is extended or adjusted under 35 U.S.C. 154(b) by 1051 days.

This patent is subject to a terminal disclaimer.

(21) Appl. No.: 10/086,140

(22) Filed: Feb. 28, 2002

(65) Prior Publication Data

US 2002/0126995 A1 Sep. 12, 2002

Related U.S. Application Data

(63) Continuation of application No. 09/316,780, filed on May 21, 1999, now Pat. No. 6,415,099.

(30) Foreign Application Priority Data

May 22, 1998 (EP) .................................. 98890150

(51) Int. Cl.
*H04N 5/91* (2006.01)

(52) U.S. Cl. ......................................... 386/83; 725/53

(58) Field of Classification Search .................... 386/1, 386/83; 725/53, 139, 141; 707/3, 5–7, 531, 707/532

See application file for complete search history.

(56) References Cited

U.S. PATENT DOCUMENTS

| 5,371,676 | A | | 12/1994 | Heemels et al. |
| 5,787,426 | A | * | 7/1998 | Koshiba et al. ................ 707/7 |
| 5,924,068 | A | | 7/1999 | Richard et al. |
| 5,977,964 | A | | 11/1999 | Williams et al. |
| 6,061,056 | A | * | 5/2000 | Menard et al. ............. 725/141 |
| 6,240,378 | B1 | * | 5/2001 | Imanaka et al. ................ 704/9 |

FOREIGN PATENT DOCUMENTS

WO WO9305618 3/1993

\* cited by examiner

*Primary Examiner*—James J. Groody
*Assistant Examiner*—Christopher Onuaku (57) ABSTRACT

A recording arrangement (1) for receiving and recording a television signal (F) and for receiving an information signal (I) which contains television program information (FPI), for example, title information about future television programs. The recording arrangement (1) has a keyword detector (54) which derives at least one keyword characteristic of the fields of interest of the user from title information of a television program recorded by the recording arrangement (1). A selector (58) selects, from the title information of future television programs, which is contained in the television program information (FPI), the title information containing at least one detected keyword. Selected television programs can be displayed on a display device (3) or can be recorded automatically.

8 Claims, 3 Drawing Sheets

| Keyword | Recurrence count |
|---|---|
| Children | 3 |
| Austria | 4 |
| Golf | 2 |
| Championship | 4 |
| Sailing | 1 |
| Opera | 2 |
| Soccer | 7 |
| Airplane | 1 |
| Magnum | 6 |
| Dreamboat | 1 |
| Computer | 4 |
| Diana | 7 |
| News | 12 |
| Garden | 3 |

FIG.3

RECORDING ARRANGEMENT HAVING KEY WORD DETECTION MEANS

CROSS-REFERENCE TO RELATED APPLICATIONS

This is a continuation of U.S. patent application Ser. No. 09/316,780, filed May 21, 1999 now U.S. Pat. No. 6,415,099.

BACKGROUND OF THE INVENTION

1. Field of the Invention

The invention relates to a recording arrangement having receiving means for receiving a television signal and an information signal in which television program information can be transmitted, and having recording means for recording a processed received television signal of a television program, and having selection means for selecting at least one television program whose title information contained in the television program information contains at least one given keyword.

2. Description of the Related Art

Such a recording arrangement of the type defined in the opening paragraph is known from International Patent Application WO 93/05618 (PCT/DE92/00733) and is formed by a video recorder and a remote control device which cooperates with the video recorder. The known arrangement has receiving means for receiving a television signal, which can be reproduced as a television program on a television set which can be connected to the recording arrangement. After processing in signal processing means, a received television signal of a television program can be recorded as a processed received television signal with the aid of recording means of the recording arrangement.

The receiving means are further adapted to receive an information signal transmitted in blanking intervals of a television signal. The information signal conveys digital data representing an electronic program guide, this data including television program information, such as, date, starting time, ending time and title of television programs, which can be received, for example, within the next week, as a television signal from a television station via a television channel. Such an electronic program guide is known, for example, as the "Electronic Program Guide (European Telecommunication Standard ETS 300 707).

An information signal received by the known video recorder can be applied to the remote control device. The remote control device includes a television program memory in which television program information on future television programs, as derived from the information signal, can be stored. The remote control device further comprises selection means formed by a plurality of keys each corresponding to a given theme, such as, for example, "westerns", "operas", "news" or "shows". By actuating one of these keys, it is possible to select television programs stored in the television program memory and corresponding to the theme of the actuated key. Moreover, in a keyword entry mode, a letter can be assigned to each key of the remote control device, these keys allowing a user of the video recorder to enter a keyword by hand. Thus, it is possible to actuate a remote control key assigned to, for example, the theme "comedy" and, in addition, to enter the keyword "Elvis" by hand in the keyword entry mode in order to select those television programs stored in the television program memory, which should be assigned to the theme "comedy" and whose titles contain the keyword "Elvis". One or more of the selected television programs can be displayed on the television set connected to the known recording arrangement.

In this way, the television set can display a list of recording suggestions for television programs which may be of interest to the user of the known recording arrangement. Displaying a list of recording suggestions greatly facilitates the choice of a television program which is of interest to the user in order to be recorded by means of the recording arrangement. Furthermore, the list of recording suggestions greatly facilitates programming of the recording arrangement for a time-shifted recording.

However, with the known recording arrangement, it has been found that the themes assigned to the keys of the remote control device by the manufacturer of the recording arrangement hardly ever adequately represent the themes which are of interest to the user. On the one hand, the themes assigned to the keys, such as, for example, "soccer", "tennis", "combat sport" and "swimming" are hardly used by a user who is not very keen on sports, while, in the case that another theme such as "serials" has been preset, the television set will show an excessively long list of recording suggestions, which does not simplify the choice of a television program. Therefore, it is also necessary to enter a keyword by hand in order to obtain a list of recording suggestions which is adapted to the user's interests. The actuation of one of the many keys of the remote control device in order to preset a theme and the additional actuation of one of the many keys in order to preset a keyword for the user cannot be effected in a easy and reliable manner, as a result of which the operating convenience of the known recording arrangement is not very high. Moreover, the number of themes is limited by the number of keys of the remote control device, which is also a disadvantage. Moreover, the broadcasting station should assign an appropriate theme to each television program, and for each television program, a characteristic code corresponding to this theme should be transmitted in the information signal for each television program and should be decoded in the recording arrangement, which requires a substantial expense. Furthermore, it is, each time, necessary to manually enter keywords, which further reduces the operating convenience.

SUMMARY OF THE INVENTION

It is an object of the invention to eliminate the aforementioned problems and to provide an improved recording arrangement of the type defined in the opening paragraph. In a recording arrangement of the type defined in the opening paragraph, this object is achieved in that keyword detection means have been provided for detecting at least one item of title fragment information of title information of a television program recorded by the recording means as a processed received television signal, and in that at least one detected keyword can be used as a given keyword by the selection means. Thus, it is achieved that title information representing a title of a television program, recorded by the user by means of the recording arrangement because this television program is of interest to him, is used to determine at least one keyword which characterizes the user's interest. Suitably, a keyword is then determined automatically without any operations by the user being required or without being tied to a given type of programming of the recording arrangement in order to record a television program—for example, VPT programming or Show View programming. A keyword thus determined automatically has the advantage that it very accurately agrees with the current interest of the user.

In a recording arrangement as defined above, it has proven to be advantageous to provide a keyword memory for storing at least one detected keyword. This has the advantage that all the automatically determined keywords are stored and thus a database of keywords is obtained which is a very accurate representation of the user's interest profile with regard to the television programs recorded by the user and what future television programs he is likely to be interested in. A list of recording suggestions of television programs whose titles contain at least one of the stored keywords will therefore include a multitude of television programs which are of interest to the user.

In a recording arrangement as defined above, it has proven to be advantageous to adapt the keyword memory to store a recurrence count for each keyword, which recurrence count can be incremented upon each further detection of this keyword by the keyword detection means, and in that for the selection of television programs, the selection means can apply only those keywords whose recurrence counts have values which exceed a selection threshold value which depends on at least one other value of a recurrence count stored in the keyword memory. As a result of this, it is achieved that the selection means only select those television programs whose titles include a keyword which has already been detected comparatively frequently and is therefore of particular interest to the user. Thus, changing interests of the user are taken into account automatically because the count of the occurrence of a keyword, as, for example, "Magnum" is not incremented if no further installment of the serial "Magnum" is recorded.

In a recording arrangement as defined above, it has proven to be advantageous that keywords whose recurrence counts have values below a minimum threshold value are periodically erasable from the keyword memory by the keyword detection means. As a result of this, it is achieved that only rarely detected keywords are erased periodically, for example, once a month, from the keyword memory and the storage capacity of the keyword memory is thus utilized effectively. Moreover, it is thus achieved that only those keywords which have been detected not too long ago are used for determining television programs which are likely to interest the user.

In a recording arrangement as defined above, it has proven to be advantageous that a television program memory has been provided, in which television program information derived from a received information signal can be stored. As a result of this, it is achieved that all the television program information of television programs which can be received from a television station via a receiving channel within the next week are available for the selection means without delay in order to select a television program which is of interest to the user.

In a recording arrangement as defined above, it has proven to be advantageous that display signal generating means is adapted to be also activated manually so as to generate a display signal representing television program information of selected television programs, and that the display signals can be applied to display means capable of displaying a list of recording suggestions containing television program information of at least one selected television program and that television program information of one of the selected and displayed television programs can be marked manually by recording programming means and the recording arrangement is thereby programmable to record the television program thus marked. A user can then actuate a suggestion programming key of the recording arrangement, which enables display signal generating means to generate a display signal representing a list of recording suggestions, this signal being displayable as a list of recording suggestions on a television set, which constitutes display means. By the actuation of a marking key, one of the selected television programs given in the list of recording suggestions can be marked manually by the user and the recording arrangement can thus be programmed so as to record the marked television program. This yields a particularly simple method of programming the recording arrangement so as to record a selected television program.

In a recording arrangement as defined above, it has proven to be advantageous that the keyword detection means detects only title fragment information having a minimum number of characters as keywords. Thus, it is achieved that words which are used in a title and which form title fragment information—such as, for example, "the", "as" or "in"—are not used for determining keywords if they comprise, for example, only three or less letters, also occur in other meanings in a plurality of words and are, therefore, not suitable for describing the field of interest of the user.

In a recording arrangement as defined above, it has proven to be advantageous that an exclusion memory has been provided, said exclusion memory being adapted to store at least title fragment information which is to be excluded as a keyword by the keyword detection means. Thus, it is achieved that certain words which form title fragment information—such as, for example, "when" or "maybe"—are not defined as keywords because these words are not suitable for describing the field of interest of the user.

In a recording arrangement as defined above, it has proven to be advantageous that the recording means are adapted to automatically record a television program selected by the selection means. Thus, it is achieved that the recording arrangement automatically records television programs which are of interest to the user and, for example, every night, the user choose from a selection of television programs which have been recorded during the day and which are, for the greater part, interesting for him. This possibility is particularly advantageous for the recording of digital television signals on digital storage media having a large storage capacity.

In a recording arrangement as defined above, it has proven to be advantageous that the receiving means is adapted to receive an information signal from a computer data network. Thus, it is achieved that an information signal containing television program information can be received by the recording arrangement from a computer data network, such as, the Internet, a cable TV system or via a data link to a computer.

The aforementioned as well as further aspects of the invention will be apparent from the embodiment described hereinafter by way of example and will be elucidated with reference to this embodiment.

DESCRIPTION OF THE PREFERRED EMBODIMENTS

Figure 1:
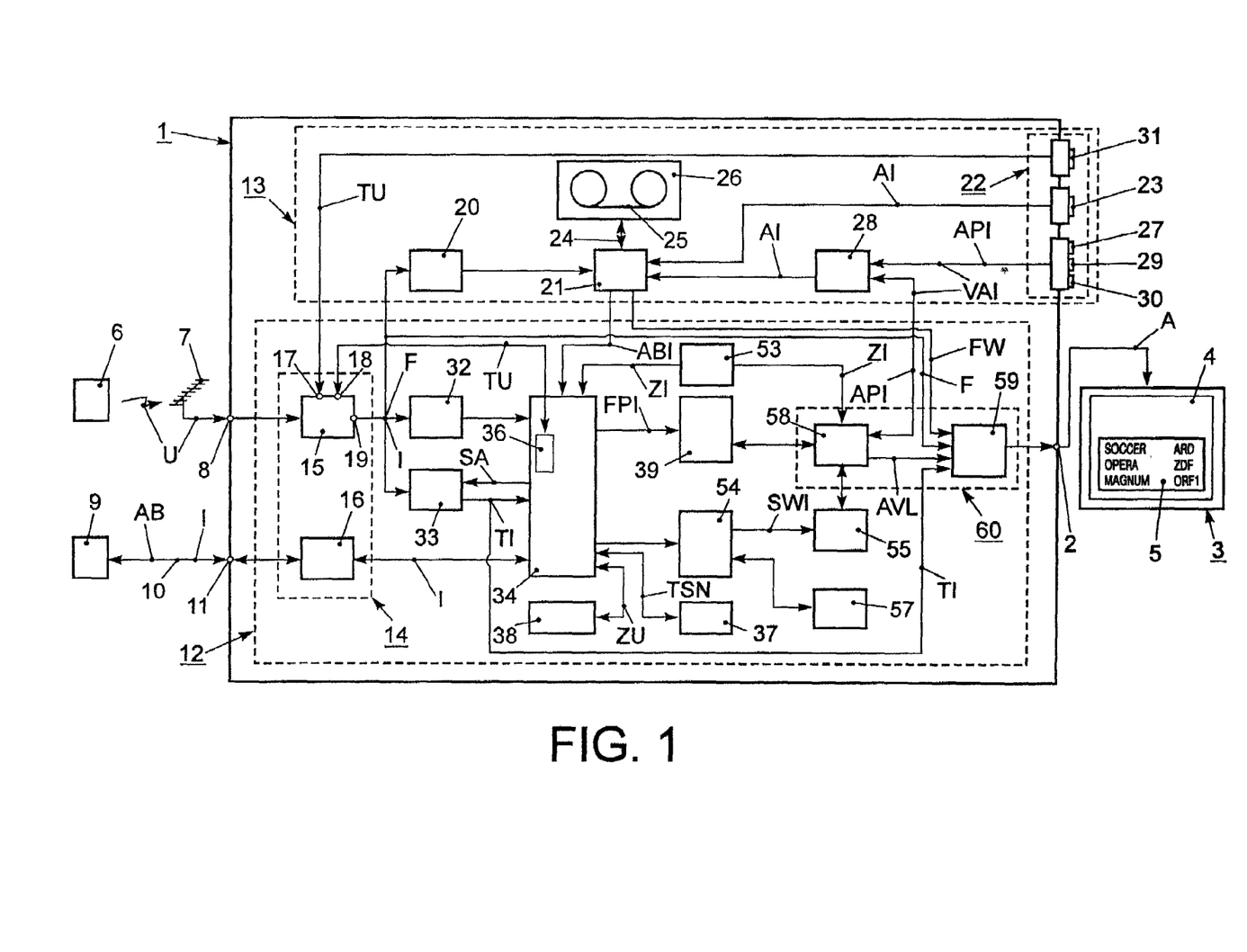
FIG. 1 is a block diagram of a video recorder which forms a recording arrangement and which includes a television signal processing device having keyword detection means for determining character strings of a title as a keyword which is indicative of the field of interest of a user of the video recorder.

FIG. 1 shows a video recorder 1 which constitutes a recording arrangement. A display signal A can be applied from an output terminal 2 of the video recorder 1 to a television set 3, which forms a display means connected to the output terminal 2. A display signal A comprises a television signal F, which can be displayed as a television program on a viewing screen 4 of the television set 3 and, if applicable, an OSD signal, which can be displayed on the viewing screen 4 as a so-called on-screen display 5 and which contains text information.

A broadcasting station 6 can transmit a transmission signal U, which can be received by means of a receiving antenna 7. A transmission signal U comprises a plurality of television signals F from different television stations, these signals each being transmitted via a receiving channel E. A receiving channel E, which is identified by a frequency band of the transmission signal U, transmits, for example, a television signal F which conveys television programs from the television station ORF1 and which is identified by television signal identification information FKI. Television signals F which convey television programs from the television stations ORF2, ARD, ZDF and other television stations, some of which are identified by further television signal identification information FKI, are transmitted via further receiving channels E.

In some of the television signals F transmitted by the broadcasting station 6, information signals I are transmitted in blanking intervals of the television signals F, no picture or sound information being transmitted in the blanking intervals. An information signal I conveys digital data containing VPS information (Video Program System) and teletext information TI. Each television program received as a television signal F is identified by given VPS information. Moreover, the VPS information of an information signal I also includes television signal identification information FKI which identifies the television signal F. Teletext information TI can be received as data block information in data blocks, which are known as teletext pages, in successive receiving cycles having the same content which recur substantially every 30 to 60 seconds. Teletext information TI of a television signal F may contain a multitude of information, such as, for example, news information, weather information and, inter alia, also television program information FPI of television programs from one or more television stations. The television program information FPI can be information which includes television signal identification information FKI, such as, the date, the starting time and ending time, title information representing the title, as well as the VPS information of a given television program. As a rule, teletext information TI includes television program information FPI of television programs which can be received, for example, within the next week, as a television signal F via a television channel E, this television signal being identified by television signal identification information FKI included in the teletext information TI. A transmission signal U received by the receiving antenna 7 can be applied to an input terminal 8 of the video recorder 1.

A computer 9 can supply a further information signal I containing further television program information FPI to an information signal terminal 11 of the video recorder 1 via a data link 10 of a computer data network. The computer 9 then forms a so-called server which is connected to the internet and which stores current television program information FPI about television programs from a large number of television stations in digital form. Television program information FPI stored in the computer 9 can be retrieved by the video recorder 1 via the data link 10 as an information signal I. For this purpose, the video recorder 1 can transfer call information AB from the information signal terminal 11 to an internet address which identifies the computer 9. When call information AB appears, the computer 9 is enabled to transfer the television program information FPI stored in the computer 9 to the information signal terminal 11 of the video recorder 1 via the data links 10.

The video recorder 1 comprises a television signal processing device 12 and recording means 13. The television signal processing device 12 is adapted to process a transmission signal U received at the input terminal 8 and an information signal I applied to the information signal terminal 11, and also to independently derive television program information FPI from the received information signals I. The television signal processing device 12 includes receiving means 14 formed by a tuner 15 and interface means 16. The interface means 16 of the receiving means 14 is connected to the information signal terminal 11 and, as explained hereinbefore, is adapted to receive an information signal I from a computer data network.

The tuner 15 is connected to the input terminal 8 and is adapted to receive at least one television signal F contained in the transmission signal U over at least one receiving channel E which is receivable by the receiving means 14 and to receive an information signal I conveyed in the blanking intervals of a television signal F, this information signal comprising data blocks containing data block information and being receivable in recurring receiving cycles. The data block information is then formed by teletext information TI and the data blocks by teletext pages.

A so-called tuner voltage TU can be applied to the tuner 15 via the tuner inputs 17 and 18. When a tuner voltage TU appears, a television signal F transmitted in the transmission signal U via the receiving channel defined by the tuner voltage TU, together with an information signal I which may be contained in the television signal F, can be supplied to a tuner output 19 of the tuner 15.

The recording means 13 includes a recording signal processing stage 20 to which a received television signal F supplied to the tuner output 19 can be applied. A received television signal F processed in the recording signal processing stage 20 can be applied to a control stage 21 of the recording means 13. The recording means 13 further includes a keypad 22 having a plurality of keys for controlling the video recorder 1. The keys include a recording key 23 by means of which a recording activation signal AI can be applied to the control stage 21 to activate a recording mode of the video recorder 1. The recording means 13 is adapted to record a processed and received television signal F of a television program in the recording mode. For this purpose a processed and received television signal F from the control stage 21 can be recorded on a magnetic tape 25 of a magnetic-tape cassette 26 via a recording and playback line 24. Such a recording and playback line 24, by means of which a processed and received television signal F can be recorded and played back in accordance with a helical-scan recording and playback method in conformity with the VHS standard, is well known.

The keypad 22 further comprises keys, represented here as a Show-View programming key 27, by means of which the recording means 13, can be programmed in accordance with the well-known Show-View programming method in order to record a television program that can be received at a later instant. In accordance with the Show-View programming method, a given numerical combination, which identifies the date, the starting and ending time and the television signal identification information FKI of a television program, can be entered in order to program the recording means 13 for recording this television program. A numerical combination entered by means of the Show-View programming keys 27 as recording programming information API can be applied to a recording programming stage 28 of the recording means 13. In a manner not shown in FIG. 1, the recording programming stage 28 is adapted to supply a recording activation signal AI to the control stage 21 for recording a scheduled television program exactly at the instant at which the scheduled television program is received by the video recorder 1.

The keypad 22 further comprises keys, represented here as a suggestion programming key 29, which, in a simple manner, enable a television program to be programmed for recording, of which television program, the title is displayed on the on-screen display 5 of the viewing screen 4 and which is marked by a user of the video recorder 1, as will be described in more detail hereinafter.

The keypad 22 further comprises keys, represented here as a marking key 30, by means of which a character string of text information shown on the on-screen display 5 can be marked, as will also be described in more detail hereinafter.

The keyboard 22 further comprises keys, represented here as a receiving channel selection key 31, by means of which, in a manner not shown in FIG. 1, tuner voltages TU can be generated and applied to the tuner input 17 of the tuner 15. Actuation of the receiving channel selection key 31 allows a user of the video recorder 1 to select a television signal F from the television signals F transmitted in the transmission signal U via receiving channels E, this selected television signal being available on the tuner output 19 of the tuner 15.

A television signal F on the tuner output 19, together with an information signal I which may be present in blanking intervals of the television signal F, can be applied to a decoder stage 32 of the television signal processing device 12. The decoder stage 32 is adapted to detect VPS information which may be present in the information signal I.

A television signal F appearing on the tuner output 19, together with an information signal I which may be present in blanking intervals of the television signal F, can further be applied to an information detection stage 33 formed by a so-called teletext IC. The information detection stage 33 is adapted to detect data block information identified by a given data block address in each receiving cycle of the received information signal I, and thus to detect teletext information TI contained in the information signal I. The information detection stage 33 can be preset with a data block address formed by a teletext page number TSN, upon which the information detection stage 33 is adapted to detect the teletext page identified by the teletext page number TSN and teletext information TI contained therein in a receiving cycle of the received information signal I.

The television signal processing device 12 further comprises television program information determining means 34 for detecting and storing television program information FPI contained in one or more information signals I for the television signal F of television transmissions of at least one receivable receiving channel E, and for thus detecting television program information FPI contained in data block information detected by means of the information detection stage 33. The television program information determining means 34 is further adapted to preset at least one further data block address for the information detection stage 33 to detect further television program information FPI contained in the information signal I. For this purpose, VPS information detected by the decoder stage 32 and teletext information TI detected by the information detection stage 33 can be applied to the television program information determining means 34.

The television program information determining means 34 uses a program information determining algorithm for determining television program information FPI from the teletext information TI supplied to the television program information determining means 34 by the information detection stage 33, and which is explained hereinafter with reference to a flowchart 35 shown in FIG. 2. The television program information determining means 34 includes a switching stage 36 which, during the execution of the television program information determining algorithm, can independently switch the receiving means 14 to the reception of at least one further information signal I in blanking intervals of the television signal F in order to enable further television program information I to be determined independently by the television signal processing device 12. For this purpose, the switching stage 36 is connected to the tuner input 18 of the tuner 15 and is adapted to supply a tuner voltage TU which controls the tuner 15. This will described in greater detail in the description of the television program information determining algorithm.

The television signal processing device 12 further includes a data block address memory 37 which can store at least one item of television signal identification information FKI identifying a received television signal F, or receiving channel identification information EKI with at least one associated data block address which identifies a data block of an information signal I contained in a television signal F received via a receiving channel E. Each receiving channel E that can be received by the tuner 15 is identified by receiving channel identification information EKI. In currently commercially available video recorders, for example, 99 receiving channels E can be stored at so-called program positions whose numbers form receiving channel identification information EKI. The data block address memory 37 can store a data block address formed by a teletext page number TSN for each item of receiving channel identification information EKI which identifies a receiving channel via which a television signal F can be received. During the manufacture of the video recorder 1, a teletext page number TSN=301 has been stored in the data block address memory 37 for each item of receiving channel identification information EKI because this teletext page number TSN identifies teletext information TI which very often contains television program information FPI for the currently known information signals I. During the manufacture of the video recorder 1, teletext page numbers TSN, relating to teletext information TI containing the television program information FPI, have been stored in the data block address memory 37, in correlation with television signal identification information FKI of those information signals I which contain television signal identification information FKI. The television program information determining means 34 is adapted to determine stored teletext page numbers TSN for received television signal F by comparing television signal identification information FKI of television signals F, determined by means of the decoder stage 32, with television signal identification information FKI stored in the data block address memory 37. This will be elucidated with reference to the flowchart 35.

The television signal processing device 12 further includes an additional information memory 38 in which additional information ZU about the information signal I can be stored, in correlation with television signal identification information FKI of the television signal F or receiving channel identification information EKI of the receiving channel E, this additional information having already been derived from an information signal I of a television signal F received via a receiving channel E in a television program information determining algorithm, and being usable, advantageously, for a subsequent television program information determining algorithm. The additional information ZU can be, for example, information that VPS information, VPT information or time information has already been found in teletext information TI of a teletext page, or information whether a teletext page has teletext sub-pages. Teletext sub-pages contain teletext information TI which cannot be received in every receiving cycle of the information signal I. The teletext page having the teletext page number TSN=301 has, for example, two teletext subpages. In this case, only the teletext information TI of the teletext sub-page 301/1 is received in one or more receiving cycles of the information signal I and subsequently only the teletext information TI of the teletext sub-page 301/2 is transmitted in one or more receiving cycles. Additional information ZU can also be transmission information which indicates which teletext page numbers TSN are transmitted in the information signal I.

During the manufacture of the video recorder 1, additional information ZU about information signals I containing television signal identification information FKI has been stored in the additional information memory 38, in correlation with said television signal identification information FKI. The television program information determining means 34 is adapted to determine stored additional information ZU about received television signal F by comparison of television signal identification information FKI of television signal F detected by means of the decoder stage 32 with television signal identification information FKI stored in the additional information memory 38. Additional information ZU about information signals I facilitate and speed up the determination of television program information FPI in the television program information determining algorithm. This will be described in more detail with reference to the flowchart 35.

The television signal processing device 12 further includes a television program memory 39 in which television program information FPI derived from a received information signal I can be stored, this information relating to television programs which can be received, for example, within the next week from one or more television stations via one or more receiving channel E.

Hereinafter, the television program information determining algorithm executed in the television program information determining means 34 is explained with reference to the flowchart 35. The process, in accordance with the flowchart 35, starts in a block 40, for example, every day at 9.00 a.m. Most receiving channels E can already receive a television signal F at this time and it is known that video recorders are hardly used at that hour. As already explained hereinbefore, the television program information determining algorithm is carried out only when the video recorder 1 is not used by the user and, consequently, the television signal processing device 12 can independently carry out the television program information determining algorithm in accordance with the flowchart 35.

In a block 41, which is carried out subsequently to the block 40, it is ascertained whether the video recorder 1 is in a stand-by mode or whether the video recorder 1 is being used by a user, for example, for playing back a recorded television program from the cassette 26. When the video recorder 1 is not in the stand-by mode, the television program information determining algorithm is terminated in a block 42. Conversely, when the video recorder 1 is in the stand-by mode, the television program information determining algorithm proceeds in the block 43.

In the block 43, the switching stage 36 supplies a tuner voltage TU to the tuner input 18 in order to achieve that the tuner 15 transfers a television signal F which can be received via the receiving channel E=1 to its tuner output 19.

In a block 44, which is carried out subsequently to the block 43, it is ascertained whether the television signal F available at the tuner output 19 contains teletext information TI in the blanking intervals of the television signal F. The television program information determining means 34 then supplies page request information SA to the information detection stage 33, and it is checked whether the information detection stage 33 can detect teletext information TI. When the information detection stage 33 cannot detect teletext information TI because no information signal I is conveyed in the television signal F, the process of the flowchart 35 is continued in the block 45.

In the block 45, the switching stage 36 supplies a tuner voltage TU to the tuner input 18 so as to achieve that the tuner 15 transfers a television signal F which can be received via the receiving channel E=2 to its tuner output 19.

In a block 46, which is carried out subsequently to the block 45, it is ascertained whether, in the process in accordance with the flowchart 35, all the receiving channels E that can be selected for receiving a television signal F have already been selected. If all the receiving channels E for receiving a television signal F have already been selected, the process is terminated in the block 42. Conversely, if all the receiving channels E which can be selected by the tuner 15 have not yet been selected, the process is continued in the block 44.

When, in the block 44, it is found that an information signal I is conveyed in the television signal F received via the receiving channel E=2 and supplied to the tuner output 19, the process proceeds to a block 47. In the block 47, the television program information determining means 34 can preset a given preferential data block address formed by a preferential teletext page number VTSN defined by the switching stage 36 of the information detection stage 33 for a received information signal I. Such a preferential teletext page numbers VTSN are transmitted in the information signals I by television stations, such as, for example, ORF1, ORF2 or ARD, and are known, for example, as so-called "Basic TOP Table", "Multi Page Table" or "Magazine Inventory Page". During the manufacture of the video recorder 1, preferential teletext page numbers VTSN were stored in the additional information memory 38, in correlation with television channel identification information FKI. During the execution of the block 47, page request information SA containing this preferential teletext page number VTSN is applied to the information detection stage 33 and, upon termination of a receiving cycle of the information signal I or upon expiration of a given time interval, it is checked whether teletext information TI has been detected by the information detection stage 33. If teletext information TI has been detected by the information detection stage 33, teletext page numbers TSN can be derived from the detected teletext information TI, these page numbers identifying the teletext information TI of the information signal I in which the television program information FPI is contained. In the present case, a detected teletext page number TSN can be impressed upon the information detection stage 33 as page request information SA. Furthermore, additional information ZU, such as, for example, the number of teletext subpages of a teletext page, can be derived from teletext information TI identified by a preferential teletext page number TSN and can be stored in the additional information memory 38 in correlation with the receiving channel identification information EKI of the selected receiving channel E. Subsequently, the process, in accordance with the flowchart 35, proceeds in a block 48.

When, in the block 47, no teletext information TI for the given preferential teletext page numbers VTSN can be derived from the information signal I, the process, in accordance with the flowchart 35, proceeds to the block 49. In the block 49, after a change-over of the receiving means 14 by the switching stage 36, the television program information determining means 34 can autonomously preset the information detection stage 33 to a data block address stored in the data block address memory 37 and allocated to television signal identification information FKI or receiving channel identification information EKI identifying the received television signal F, in order to determine data block information identified by the data block address. As the block 49 is carried out, a teletext page number TSN is read from the data block address memory 37, this number having been stored in correlation with the number of the receiving channel E=2, which then constitutes receiving channel identification information EKI, and from which, already, television program information FPI could be derived in a preceding television program information determining algorithm, or which, during the manufacture of the video recorder 1, has been stored in correlation with the television signal identification information FKI received via the receiving channel E=2. The process, in accordance with the flowchart 35, proceeds to the block 48 after a teletext page number TSN obtained from the data block address memory 37 has been preset in the information detection stage 33.

In the block 48, it is checked whether the teletext information TI detected by the information detection stage 33 contains television program information FPI. In a first step of this check, it is verified whether the detected teletext information TI complies with the VPT standard (Video recorder Programming by Teletext) and, in addition, contains VPT information. If the teletext information TI complies with the VPT standard, which is the case, for example, for information signals transmitted by the television stations ORF1, ORF2, ARD or ZDF, in which hidden or visible VPT information identifying television program information FPI is contained in the teletext information TI, the television program information FPI can be determined in a particularly reliable manner.

When, in the first step of the check in the block 48, it is found that the detected teletext information TI does not contain hidden VPT information in accordance with the VPT standard, it is verified, in a second step of the check, whether the hidden teletext information TI associated with the given teletext page number TSN is contained in a so-called "packet 26", which characterizes television program information FPI in teletext information TI identified by the teletext page number TSN. Information contained in a "packet 26" is defined in the PDC standard (Program Delivery Code).

When, in the second step of the check in the block 48, it is found that the "packet 26" neither contains hidden information for the identification of television program information FPI in teletext. information TI identified by the teletext page number TSN, it is checked, in a third step, whether teletext information TI corresponding to time information is contained in the teletext information TI detected by the information detection stage 33. For this purpose, the teletext information TI is examined for character strings which comply, for example, with the format "XX:XX" or "XX.XX", where "X" is a number from "0" to "9" and the first "X" should be a number from "0" to "2" and the third "X" a number from "0" to "15". These formats correspond to customary time representation formats such as, for example, "13:20" or "13.20". If character strings in accordance with these formats are detected in teletext, information TI as time information which recurs at given intervals, as is customary for displaying a plurality of starting times arid tittles of television programs in a teletext page, the first time information is interpreted as the starting time of a television program, characters following this number as the title of the television program and subsequent time information in the teletext information TI as the ending time of this television program.

When television program information FPI is already detected in the first step of the check in the block 48, the subsequent steps of the check are not carried out. Likewise, when television program information FPI is detected in the second step of the check in the block 48, the third step of the check is not carried out.

If, in all the three steps of the check in the block 48, it is found that no television program information FPI is contained in the teletext information TI detected by the information signal detection stage 33, the process, in accordance with the flowchart 35, proceeds in the block 50. Conversely, if, in one of the three steps of the check in the block 48, television program information FPI is detected in the teletext information TI, the process, in accordance with the flowchart 35, proceeds in the block 51.

In the block 51, television program information FPI determined by the television program information determining means 34 is stored in the television program memory 39. In the block 51, the television program information determining means 34 is adapted to autonomously store the last preset data block address in the data block address memory 37 in conjunction with television signal identification information FKI or receiving channel identification information EKI identifying the received television signal F after data block information has been derived successfully from television program information FPI. The teletext page number TSN to which the information detection stage 33 has been preset is then stored in the data block address memory 37, in correlation with the number of the receiving channel E received by the tuner 15, this number then forming receiving channel identification information EKI. Subsequently, the process, in accordance with the flowchart 35, proceeds with the block 50.

In the block 50, in a first step after presetting of a first data block address obtained from the data block address memory 37, the television program information determining means 34 is adapted to successively preset further data block addresses which alternately have increasing and decreasing numbers in relation to the first data block address, in order to determine data block information. For example, after presetting of a first teletext. page number TSN=301 obtained from the data block address memory 37, the television program information determining means 34 is adapted to preset the teletext page number TSN=302 and, in a subsequent operation in the block 50 of the flowchart 35, to preset the teletext page number TSN=300. Thus, teletext information TI, identified by teletext page numbers TSN around the first teletext page number TSN, is determined from whose teletext information TI which they identify already television program information FPI was derived in a preceding process of determining television program information FPI.

In a second step of the block 50, the television program information determining means 34 is adapted to preset a teletext sub-page number of a teletext page number preset in the first step if the additional information memory 38 stores additional information ZU for the received information signal I, indicating that the preset teletext page number has a teletext sub-page number.

In a third step of the block 50, the television program information determining means 34 is adapted to verify whether the additional information memory 38 stores additional information ZU which forms transmission information about the teletext page numbers TSN transmitted in the received information signal I and, if the answer is affirmative, to check whether teletext page number TSN, preset in the first step of the block 50, is actually transmitted in the information signal I and, if the answer is negative, to preset a further teletext page number TSN. As a result of this, it is achieved that, for the detection of data block information, the information detection stage 33 can only be preset to data block addresses which relate to data blocks which are actually transmitted in the received information signal I. This precludes waiting times which would occur if the information detection stage 33 was set to a data block address not transmitted in the information signal I.

In a fourth step of the block 50, the television program information determining means 34 are adapted to check, if applicable by evaluation of additional information ZU stored in the additional information memory 38, whether, for the information signal I received by the tuner 15 via the receiving channel E, already all the teletext page numbers TSN have been preset which identify, in the information signal I, teletext information TI from which television program information FPI may be derived. If no such additional information ZU has been stored, it is also possible to scan all the teletext pages conveyed in the information signal I for television program information FPI contained in the teletext information TI of these pages. If, in the block 50, a teletext page number TSN has been found which identifies teletext information TI from which television program information FPI might be derived successfully, the process is continued in the block 52.

In the block 52, a teletext page number TSN determined in the block 50 is applied to the information detection stage 33 as page request information SA and teletext information TI detected by the information detection stage 33 is checked in the block 48 as explained hereinbefore.

If, in the block 50, no teletext page number TSN could be detected which identifies teletext information TI from which television program information FPI could be derived with success, the process proceeds to the block 45. The process, in accordance with the flowchart 35, will be described in more detail hereinafter with reference to an example.

The control stage 21 of the recording means 13 can supply recording mode information ABI to the television program information determining means 34 when the recording means 13 has been set to the recording mode. When recording mode information ABI occurs, the television program information determining means 34 is adapted to determine the television program information FPI stored in the television program memory 39 during the television program information determining algorithm, which television program information FPI should be assigned to the television program recorded at that time by the recording means 13. For this purpose, the television program information determining means 34 is adapted to compare VPS information, identifying the recorded television programs and detected by means of the decoder stage 32, with VPS information stored in the television program memory 39. In the case of correspondence of the detected and the stored VPS information, the television program information FPI containing the stored VPS information can be read from the television program memory 39.

The television signal processing device 12 further includes a timing stage 53 which can apply time information ZI representing the current time to the television program information determining means 34. Time information ZI for the initialization of the time of the timing stage 53 can then be derived from the teletext information TI determined by the information detection stage 33 or can be set by a user of the video recorder 1 in a manner not shown in FIG. 1. When recording mode information ABI occurs, if the television signal F of a television program is recorded in which no VPS information is transmitted, the television program information determining means 34 is adapted to determine the television program information FPI stored in the television program memory 13 and relating to the television program currently recorded by the recording means 13 on the basis of the time information ZI supplied to said means by the timing stage 53 and of the received receiving channel E.

The television signal processing device 12 further comprises keyword detection means 54 for determining at least one item of title fragment information of title information of a television program recorded by the recording means 13 as a processed and received television signal F. For this purpose, the keyword detection means 54 is arranged to receive a title of a television program recorded by the recording means 13, this title having been determined by the television program information determining means 34, and being contained in the television program information as title information. Title information is parsed into title fragment information which can be formed by words or parts of words and which are determined as keywords by the keyword detection means 54. This will be described in more detail with reference to an example given hereinafter.

The television signal processing device 12 further comprises a keyword memory 55 for storing at least one keyword determined by means of the keyword detection means 54 as keyword information SWI. This yields the advantage that all the automatically determined keywords are stored, and thus a database of keywords is obtained which is a very accurate representation of the user's interest profile with regard to the television programs recorded by the user and what future television programs he is likely to be interested in. This will be described in more detail with reference to an example given hereinafter.

In the keyword memory 55, a count of the occurrence of a keyword can be stored, which count can be incremented and store again each subsequent time that this keyword is found by the keyword detection means 54. Keywords and associated recurrence counts can then be stored in the keyword memory 55 as a keyword table shown in FIG. 3. Keywords whose recurrence counts have values below a minimum threshold value can be erased periodically from the keyword memory 55 by the keyword detection means 54. The keyword detection means 54 is adapted to define title fragment information only as a keyword if it has a minimum number of characters. This will also be described in more detail with reference to an example given hereinafter.

The television signal processing device 12 further comprises an exclusion memory 57 adapted to store at least title fragment, information which is to be excluded as a keyword by the keyword detection means 54. During the manufacture of the video recorder 1, text information, such as, for example, "if" or "maybe" or "against", are stored in the exclusion memory 57 because these words do not characterize the field of interest of a user.

The television signal processing device 12 further comprises selection means 58 for the selection of at least one television program whose title, which is contained in the television program information FPI, includes at least one given keyword and which currently or soon is or will be receivable as a television signal F via another than the receiving channel E being currently received. For this purpose, the selection means 58 is adapted to compare keyword information stored in the keyword memory 55 with television program title information stored in the television program memory 39. In response to this comparison, the selection means 58 is adapted to generate a list of receiving or recording suggestions, this list containing television program information FPI of television programs which currently or soon are or will be receivable by the receiving means 14 as a television signal F of another receiving channel E currently received. The selection means 58 can preset only those keywords whose recurrence counts have values above a selection threshold value which depends on at least one other value of recurrence count stored in the keyword memory 55. This will be described in more detail hereinafter with reference to the example.

The television signal processing device 12 further includes OSD insertion means 59. The OSD insertion means 59 is arranged to receive a television signal F available on the tuner output 19 of the tuner 15. The OSD insertion means 59 is also arranged to receive a television signal FW reproduced from the magnetic tape 25 via the recording and playback line 24. The OSD insertion means 59 is further arranged to receive text information in the form of television program information FPI determined by the selection means 58 from a list of recording suggestions generated by the selection means 58. When text information supplied from the selection means 58 to the OSD insertion means 59 occurs, said OSD insertion means is adapted to generate a display signal A containing the text information, and to supply the display signal to the output terminal 2. The selection means 58 and the OSD insertion means 59 thus form display signal generating means 60 which can automatically generate a display signal A which contains detected television program information FPI of a television program whose television signal is currently received by the receiving means 14. In addition, the display signal generating means 60 is adapted to automatically generate a display signal A containing television program information FPI of at least one television program selected by the selection means 58.

By actuating the suggestion programming key 29, suggestion activation information VAI can be supplied to the recording programming stage 28 and to the selection means 58. When suggestion activation information VAI occurs, the display signal generating means 60, which is thus activated manually, is adapted to generate a display signal A representing television program information FPI of selected television programs. A display signal A, generated by the display signal generating means 60, can be supplied to display means formed by the television set 3 so as to display a list of recording suggestions AVL containing selected television programs. Here, the recording programming means is formed by keys represented as the suggestion programming key 29, by the marking key 30, by the recording programming stage 28 and by the display signal generating means 59. With the aid of the recording programming means, television program information FPI of one of the selected and displayed television programs can be marked manually- by a user, and thereby program the video recorder 1 so as to record the selected television program thus marked.

Teletext information TI detected by the information detection stage 33 can be applied to the OSD insertion means 59. When teletext information TI applied to the OSD insertion means 59 appears, the OSD insertion means is adapted to generate a display signal A containing teletext information TI, and to supply the display signal A to the television set 3 on which the teletext information TO can be displayed in a teletext display mode, which can be activated in a manner not shown in FIG. 1. By means of the video recorder 1, a user can manually mark at least title fragment information of an displayed item of teletext information TI and thereby define this information as a keyword and store it in the keyword memory 55.

The video recorder 1, and thus the recording means 13, is adapted to automatically record a television program selected by the selection means 58. For this purpose, the selection means 58 can supply recording programming information API to the recording programming stage 28. Recording programming information API includes all the television program information FPI necessary to program the recording of a television program selected by the selection means 56.

The advantages of the video recorder 1 will be illustrated hereinafter by means of an example. It is assumed that the receiving means 14 of the video recorder 1 can receive the television signal F from the television station ORF1 in the receiving channel E=1, the television signal F from the television station VOX in the receiving channel E=2, the television signal F from the television station NED1 in the receiving channel E=3, the television signal F from the television station RTL in the receiving channel E=4, and the television signal F from the television station C+ in the receiving channel E=5. It is to be noted that information signals I are transmitted in the blanking intervals of the television signals F from the television stations ORF1, NED1 and RTL, the information signal I from television station ORF1 conveying additional information ZU about its information signal I at a preferential teletext page number TSN=1FO hex, and the television station NED1 transmitting a so-called "packet 26" and the television station ORF1 transmitting VPT information for identifying television program information FPI in their information signals I. In its information signal I, the television station RTL also transmits television program information FPI, but this information is not identified by VPT information, information in a "packet 26", or other hidden information.

Figure 2:
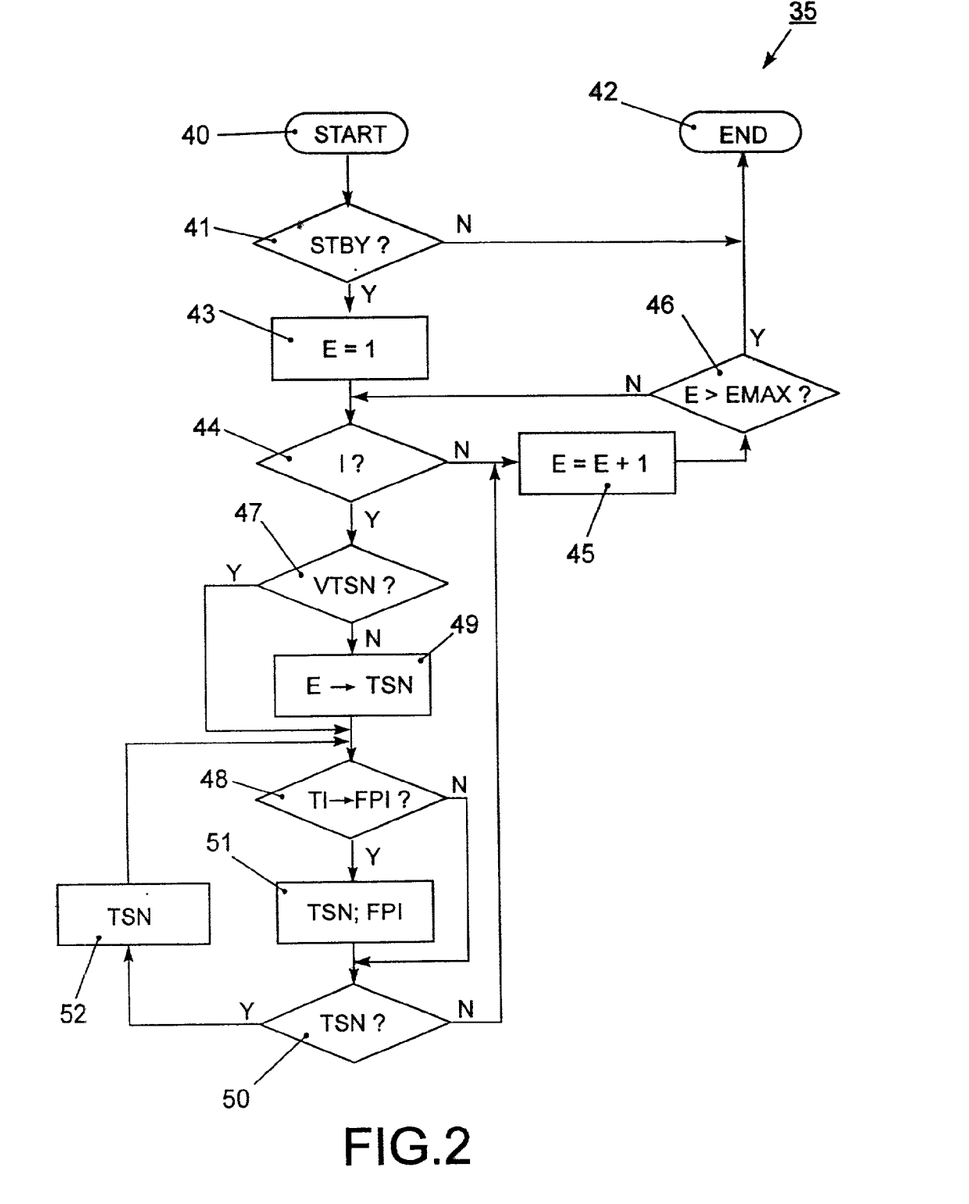
FIG. 2 is a flowchart for explaining a television program information determining algorithm which is processed in television program information determining means of the television signal processing device.

It is further assumed that the time—for example, 9:00 a.m.—is reached to which the video recorder 1 has been set, at which the television program information determining means 34 starts the process in accordance with the flowchart shown in FIG. 2, in order to determine television program information FPI contained in information signals I. As already stated hereinbefore, the television program information determining algorithm starts in the block 40. In the block 41, it is found that the video recorder 1 has been set to its stand-by mode, upon which the process, in accordance with the flowchart 35, proceeds to the block 43.

In the block 43, the television program information determining means 34 supplies a tuner voltage TU to the tuner input 18 so as to achieve that the television signal F from the television station ORF1 receivable via the receiving channel E=1 is received at the tuner output 19.

In the block 44, as stated hereinbefore, it is detected that in blanking intervals of the television signal F from the television station ORF1, an information signal I is transmitted, as a result of which the process, in accordance with the flowchart 35, proceeds to the block 47. The VPS information, which includes television signal identification information FKI which identifies the television signal F, is then also applied to the television program information determining means 34.

In the block 47, by comparison of the television signal identification information FKI, determined by the decoder stage 32, with the television signal identification information FKI stored in the additional information memory 38, and by comparison of the receiving channel identification information EKI=1, formed by the number of the selected receiving channel E, with the receiving channel identification information EKI stored in the additional information memory 38, it is checked whether a preferential teletext page number VTSN has been stored for the television signal F from the television station ORF1. The television program information determining means 34 then detects a preferential teletext page number VSTN=1FO hex stored in the additional information memory 38, in correlation with the television signal identification information FKI of television station ORF1, during the manufacture of the video recorder 1. The television program information determining means 34 is then adapted to supply page request information SA containing the preferential teletext page number VTSN=1FO hex to the information detection stage 33. From the teletext information TI detected by the information detection stage 33, the television program information determining means 34 derives that the information signal I includes television program information FPI in teletext information TI identified by the teletext page numbers TSN=311, which teletext page numbers TSN are stored, in correlation with the receiving channel identification information EK=1, as additional information ZU in the additional information memory 38. From teletext information TI identified by these teletext page numbers TSN, television program information FPI about television programs transmitted by the television station ORF1can be derived during subsequent processing in accordance with the flowchart 35. This yields the advantage that determining television program information FPI can be effected particularly rapidly and reliably because television program information FPI is derived directly from the teletext pages defined by the television station ORF1 in the preferential teletext page.

From the teletext information TI detected by the information detection stage 33 and identified by the preferential teletext page number VTSN, it further appears that, for example, the teletext page number TSN=315 has two teletext subpage numbers TS N 315/1 and TSN=315/2. The television program information determining means 34 also stores this information in the additional information memory 38 as additional information ZU in correlation with the receiving channel identification information EKI=1. This has the advantage that when television program information FPI is determined, television program information FPI can be determined particularly reliably and rapidly from teletext information TI on teletext subpages because it is apparent from the teletext information TI identified by the preferential teletext page numbers VTSN for which teletext page numbers teletext information TI is available on teletext subpages. On the one hand, it is not necessary, as a result of this, to wait for one or more receiving cycles in order to find out that a teletext pages does not have any teletext subpages and, on the other hand, this precludes that teletext information TI from teletext subpages is overlooked in determining television program information FPI.

Furthermore, transmission information is derived from the teletext information TI identified by the preferential teletext page numbers VTSN, this transmission information specifying for which teletext page numbers TSN teletext information TI is transmitted in the information signal I. These teletext page numbers TSN are also stored in the additional information memory 38 as additional information ZU in correlation with receiving channel identification information EKI=1. As a result of this, the television program information determining means 34 will subsequently preset the information detection stage 33 only to page request information SA formed by teletext page numbers TSN which are actually transmitted in the information signal I. Thus, the advantage is obtained that waiting times are avoided which would occur if the information detection stage 33 would be preset to a teletext page number TSN which is not transmitted in the information signal I, which could otherwise be detected only after having awaited one or more receiving cycles of the information signal I.

Finally, in the block 47, the information detection stage 33 is preset to page request information SA for the detection of teletext information TI, this page request information containing, for example, the teletext page number TSN=313 derived from the teletext information TI of the preferential teletext page number VTSN.

Due to the provision of the additional information memory 38 and the storage in the additional information memory 38 of additional information ZU about information signal I of television signals F receivable in receiving channels E, the advantage is obtained that once additional information ZU about an information signal I has been derived is used during each subsequent derivation of television program information FPI from these information signals I for a more rapid execution of the television program information determining algorithm.

In the block 48, it is checked whether the teletext information TI determined for the teletext page number TSN=313 actually contains television program information FPI, as specified in the preferential teletext page number VSTN. As explained hereinbefore, it is ascertained, in the first step of the check in the block 48, whether VPT information is contained in the detected teletext information TI, which is the case for detected teletext information TI from the television station ORF1.

Television program information FPI thus determined of, for example, four television programs of the television station ORF1, which will be receivable, for example, in the television signal F from the television station ORF1 in the afternoon of the same day, is stored in the television program memory 39 in the block 51. This yields the advantage that, upon completion of the television program information determining algorithm, television program information FPI of a multitude television programs of different television stations are stored on the television program memory 39, and, subsequently, individual ones of these television programs can be selected by the selection means 58 and can be displayed on the viewing screen 4 of the television set 3. Moreover, the storage capacity of the television program memory 39 is utilized particularly efficiently because the television program information FPI is derived from the teletext information TI, and only the television program information FPI is stored in the television program memory 39.

Furthermore, in the block 51, the teletext page number TSN=313 is stored in the data block address memory 37 in correlation with the receiving channel information EKI=1. This has the advantage that, in the case of information signals I, such as, for example, those from the television stations NED1 or RTL, which do not transmit preferential teletext pages in their information signals I, the determination of television program information FPI in the block 49 is started with those teletext page numbers TSN from whose teletext information TI television program information FPI was determined successfully the last time. This has the advantage that it is not necessary to determine, each time, again a first teletext page number TSN which identifies teletext TI in which television program information FPI is transmitted. As a result, television program information FPI can be determined particularly reliably and rapidly.

In the block 50, teletext page numbers TSN are preset in the information detection stage 33, for the detection of teletext information TI containing television program information FPI, in such a manner that after the first teletext page number TSN=313 has been preset, the television program information determining means 34 subsequently presets the information detection stage 43 to teletext page numbers TSN=314, TSN 312, TSN=315 and TSN=311 whose numbers alternately increase and decrease with respect to the first teletext page number TSN=313 in order to determine teletext information TI. This has the advantage that, starting from a first teletext page number TSN, which identifies teletext information TI from which television program information FPI has been derived successfully, adjacent teletext pages are scanned systematically for television program information FPI.

It is to be noted that the television program information determining means 34 can also be preset to teletext page numbers TSN which alternately increase and decrease in a different manner, for example, TSN=315, TSN=311, TSN=317 and TSN=309.

The blocks 48, 51, 50 and 52 are carried out until, in the block 50, it is detected that television program information FPI has been derived from all teletext pages identifying teletext information TI which presumably contain television program information FPI. When this is detected, the tuner is switched to receive the television signal F from the television station VOX in the receiving channel E=2 in the block 45. In the block 44, it is found that in the television signal F from the television station VOX no information signal I is transmitted, for which reason the process, in accordance with the flowchart 35, is continued in the block 45.

In the block 45, the tuner is switched to receive the television signal F from the television station NED1 in the receiving channel E=3. From the information signal I supplied by the television station NED1, television program information FPI is derived as described hereinbefore and, in the block 47, it is then found that no preferential teletext page is transmitted in the information signal I. In the block 49, the teletext page number TSN=201, stored in the data block address memory 37 in correlation with the receiving channel identification information EKI=3, is determined from whose teletext information TI, during a preceding process, in accordance with the flowchart 35, television program information FPI could be derived successfully. This yields the advantage that television program information FPI can be derived particularly rapidly from the information signal I from the television station NED1.

In the block 48, which follows the block 49, it is found, in the first step of the check in the block 48, that the teletext information TI, detected by means of the information detection stage 33, does not contain VPT information.

In the second step of the check in the block 48, it is found that television program information FPI of the detected teletext. information TI is identified by information contained in a so-called "packet 26". During a subsequent repeated execution of the blocks 51, 50, 52 and 48, all the television program information FPI is stored in the television program memory 39. After television program information FPI has been derived from all the teletext pages associated with "packet 26", the process, in accordance with the flowchart 35, is continued in the block 45.

In the block 45, the television program information determining means 34 sets the tuner 15 to the reception of the television signal F from the television station RTL via the receiving channel E=4. The further blocks 46, 44, 47 and 49 are carried out as described hereinbefore. In the first step of the check in the block 48, it is found that the teletext information TI detected by the information detection stage 33 does not contain VPT information, and in the second step of the check, it is found that the teletext information TI does not include "packet 26" information. In the third step of the check in the block 48, it is found that, as set forth hereinbefore, television program information FPI can be obtained by deriving time information from the teletext information TI. Television program information FPI, which is subsequently determined in the blocks 48, 51, 50 and 52, is stored in the television program memory 39.

Since no additional information ZU about teletext pages in which television program information FPI is transmitted can be found for the information signal I from the television station RTL, and neither any such additional information ZU is stored in the additional information memory 38, the blocks 48, 51, 50 and 52 are repeated until it is found, in the block 50, that all the teletext page numbers TSN transmitted in the information signal I have been applied to the information detection stage one time. Subsequently, in the block 45, the receiving channel E=5 is selected in which the television signal F from the television station C+ is received. In the block 44, it is found that no information signal I is transmitted in the television signal F from the television station C+, for which reason, a receiving channel E=6 is selected in the block 45. In the block 46, it is found that no television signal F is received in the receiving channel E=6 and, consequently, the television program information determining algorithm, in accordance with the flowchart 35, is terminated in the block 42.

In the example which illustrates the advantages of the video recorder 1, it has further been assumed that television program information FPI about television programs of the television station VOX and C+ is stored in the computer 9 which forms an internet server. After completion of the process, in accordance with the flowchart 35, to determine television program information FPI from teletext information TI, the television program information determining means 34 is adapted to obtain television program information FPI from computers connected to the Internet. For this purpose, the television program information determining means 34 is adapted to read an Internet address stored in the additional information memory 38 during the manufacture of the video recorder 1, and to transfer the Internet address thus read to the interface means 16. As already explained hereinbefore, the interface means 16 is then adapted to transfer call information AB to the computer 9 identified by the supplied Internet address. An information signal I, supplied by the computer 9 upon the occurrence of call information AB, is applied to the television program information determining means 34 via the information signal terminal 11 of the video recorder 1 and the interface means 16. Television program information FPI of the television stations VOX and C+ contained in the information signal I is determined by the television program information determining means 34 and is stored in the television program memory 39. This has the advantage that an information signal I containing television program information FPI can also be received by the video recorder 1 from a computer data network, such as, the Internet, or, for example, also from a TV cable system, and that television program information FPI can be derived from the information signal I thus received.

Figure 3:
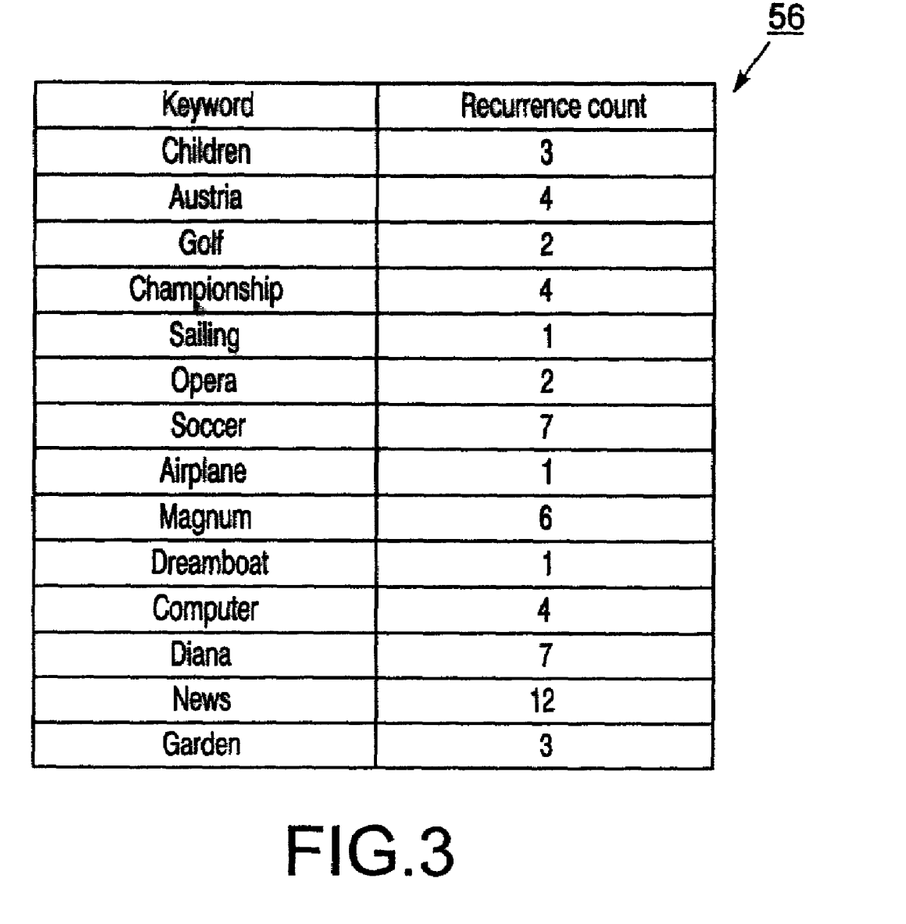
FIG. 3 shows a keyword table which can be stored in a keyword memory of the video recorder.

In the example given to illustrate the advantages of the video recorder 1, it is assumed that the keyword table 56 shown in FIG. 3 has been stored in the keyword memory 55. The keyword memory 56 stores keywords forming title fragment information, such as, for example, "children", "soccer" or "Diana". Each time that a user records a television program, keywords are derived from the title of the television program, which forms title information, as will be described in more detail hereinafter. Since, by recording a television program, the user of the video recorder 1 shows that he is interested in this television program, the keywords derived from the titles of these television programs are characteristic of the field of interest of the user. A recurrence count associated with a keyword in the keyword table 56 indicates how many times a given keyword has already been detected. As is apparent from the keyword table 56, the keywords "soccer", "Magnum", "Diana" and "News" were detected very often in titles of television programs recorded by the user. This shows the interest of the user in television programs relating to "soccer", the television serial "Magnum", reports on "Diana" and "news".

The selection means 58 is now adapted to automatically determine television programs which can be received in the future and which are of interest to the user. For this purpose, the selection means 58 is adapted to read out keywords stored in the keyword memory 55, such as, for example, the keyword "Magnum", and to determine television program information FPI stored in the television program memory 39 and relating to television programs whose titles contain the keyword "Magnum". It is then determined, for example, by which television station and when another episode of the serial "Magnum" will be receivable. The television program information FPI of subsequent episodes of the serial "Magnum" thus determined can be displayed as an on-screen display 5 on the viewing screen 4 of the television set 3. This yields the advantage that the attention of the user of the video recorder 1 is drawn to television programs which are presumably of interest to the user and the user will not miss these.

The selection means 58 is adapted to determine a selection threshold value by forming the sum of the three largest values of the recurrence counts stored in the keyword memory 55—in accordance with the keyword table shown in FIG. 3, these are the values 12+7+7=26 —and to divide this sum by the number 10—26/10=2.6. The selection means is henceforth adapted to use, for determining television programs in which a user may be interested, only those keywords whose recurrence counts have values which exceed the selection threshold value of 2.6 thus determined. As a result of this, the advantage is obtained that the selection means 58 only selects those television programs whose titles contain a keyword which has already been detected comparatively often and which is, therefore, of special interest to the user. In this way, changing fields of interest of the user are allowed for automatically because the recurrence count of keywords, such as, for example, "Magnum" are not incremented any further if no further episode of the serial "Magnum" is recorded.

It is to be noted that other methods of determining a selection threshold value are also possible.

Television program information FPI of television programs which are of interest to the user and which have been selected by the selection means 58 can be displayed on the on-screen display 5 automatically and for a given time in a first and in a second case of use of the video recorder 1, and can be displayed as a list of recording suggestions on the on-screen display 5 through actuation of the suggestion programming key 29 by the user in a third case of use. In order to illustrate the advantages of the first case of use, it is assumed that the user has set the tuner 15 to receive a television signal F from the television station RTL via the receiving channel E=4 by actuating the receiving channel selection key 31. As set forth hereinbefore, the selection means has detected that a further episode of the television serial "Magnum" is transmitted by the television station ORF1, for example, at 18:00 hours as the starting time and, consequently, can be received via the receiving channel E=1. The selection means 58 is adapted to compare the supplied time information ZI with the starting times of the television programs selected by the selection means 58. If, for example, at 17:59 hours, the selected television program "Magnum" will be receivable as a television signal F from the television station ORF1 via the receiving channel E=1, and the tuner has been set to receive the television signal F from the television station RTL via the receiving channel E=4, the display signal generating means 60 is adapted to automatically generate a display signal which contains the television program information FPI of this selected television program "Magnum". Thus, for example, at 17:59 hours, an on-screen display 5 is shown on the viewing screen 4 of the television set 3, for example, for 5 seconds, to indicate the beginning of another episode of the television serial "Magnum" of the television station ORF1 via the receiving channel E=1. Thus, it is achieved, advantageously, that the attention of a user of the video recorder 1, while viewing a television program of a television station, is drawn to the beginning of a television program from another television station which is presumably of interest to the user, by means of an onscreen display 5 briefly before the beginning of this television program. As a result of this, the user is reminded automatically and in due time of the beginning of television programs which are of interest to him.

In the second case of use, the display signal generating means 60 is adapted to generate a display signal A so as to enable an on-screen display 5 on the viewing screen 4 of the television set 3, which, immediately after the start of the video recorder 1, the user is notified, for example, for 20 seconds, of television programs which are of interest to the user and which can be received at that time or which can be received soon. This has the advantage that immediately after the video recorder 1 has been switched on, the user's attention is drawn to television programs which are of interest to the user.

Now, the third case of use is described in which television programs F selected by the selection means 58 can be displayed on the viewing screen 4 of the television set 3. By actuation of the suggestion programming key 29, an onscreen display 5 is obtained on the viewing screen 4 of the television set 3, which shows the television program information FPI selected by the selection means 58 in a list of recording suggestions. Depending on the television program information FPI determined by the television program information determining means 34 and stored in the television program memory 39, the list of recording suggestions contains, for example, television program information FPI of television programs which can be received from the television stations ORF1, NED1, RTL, VOX and C+ within the next week. By actuating the marking key 30, the position of a cursor shown in the on-screen display 5 can be changed, thus enabling one of the selected and displayed television programs to be marked by the user. When one of the selected and displayed television programs is marked by the user, the television program information FPI of this television program is transferred from the selection means 58 to the recording programming stage 28, and the video recorder 1 is then programmed to record this television program. This yields the advantage of a particularly simple method of programming the video recorder 1 to record a selected television program.

To illustrate the advantages of the video recorder 1, an example of the automatic determination of keywords from title information of television programs recorded by means of the video recorder 1 is described hereinafter. It is now assumed that the user of the video recorder 1 has activated the video recorder 1 in order to record a television program entitled "World Championship Soccer Austria against Germany". The video recorder 1 may have been activated for this recording by an arbitrary programming method, for example, by Show View programming, VPT programming or directly by actuation of the recording key 23. As described hereinbefore, the title of a recorded television program is determined in the television program information determining means 34 upon the occurrence of recording mode information ABI and is transferred to the keyword detection means 54. By the keyword detection means 54, the title "World Championship Soccer: Austria against Germany", which forms title information, is parsed into the title fragment information "Soccer", "World", "Championship", "Austria", "against", and "Germany". Subsequently, the keyword detection means 54 determines whether one of the title fragment information items is stored in the exclusion memory 57. The keyword detection means 54 then detects that the title fragment information "against" is stored in the exclusion memory 57 because this title fragment information is not suitable for satisfactorily characterizing the user's interest. As a result of this, this title fragment information "against" is not interpreted as a keyword by the keyword detection means 54.

Subsequently, the keyword detection means 54 checks whether each title fragment information item has a minimum number of at least four characters. This has the advantage that title fragment information items, such as, for example, "the", "as" or "in", are not interpreted as keywords by the keyword detection means 54 because they do not adequately characterize the user's interest.

Keywords thus determined by the keyword detection means 54 are stored in the keyword memory 55. The keyword detection means 54 also determines whether a detected keyword, such as, for example, "soccer", has already been detected and has consequently already been stored in the keyword memory 55. As is apparent from the keyword table 56 shown in FIG. 3, the keyword "soccer" has already been detected seven times, as a result of which the value of the recurrence count of the keyword "soccer" is incremented to the value 8 and is stored in the keyword memory 55. Likewise, the values of the recurrence counts of the previously detected keywords "World", "Championship" and "Austria" are incremented and stored. The keyword "Germany" is found for the first time and, therefore, this keyword is entered into the keyword table 56 with the value 1 " of the recurrence count and is then stored in the keyword memory 55. Keywords determined automatically in this manner advantageously agree very accurately with the user's interest. Changing fields of interest of the user can be detected by means of the values of the recurrence counts and can be taken into account, as explained hereinbefore, in the determination of television programs which are of interest to the user by the selection means 58.

All the keywords 55 stored in the keyword memory 55 and the values of their recurrence counts are checked periodically, for example, once a month, by the keyword detection means 54. The keywords whose recurrence counts have values below a minimum threshold value are then erased from the keyword memory 55 by the keyword detection means 54. This yields the advantage that rarely detected keywords are periodically removed from the keyword memory 55 and the storage capacity of the keyword memory is thus utilized effectively. Furthermore, it is thus achieved that only those keyword are used for determining which television programs are likely to be of interest to the user which have been detected not too long ago and frequently enough.

The video recorder 1 further makes it possible for the user himself to manually select keywords to be used for the autonomous and automatic selection of television programs by the selection means 58. For this purpose, as explained hereinbefore, teletext information TI determined by the information detection stage 33 can be displayed on the viewing screen 4 of the television set 5 in the teletext display mode of the video recorder 1. By the actuation of the marking key 30, the position of a cursor shown on the viewing screen 4 can be changed, and title fragment information of the displayed teletext information can be marked manually and is subsequently stored in the keyword memory 55 by the keyword detection means 54 in a manner not shown in FIG. 1. This method of manually selecting a keyword is particularly simple and makes it possible for the user to store also personally selected keywords in the keyword memory 55 and thus additionally define his fields of interest.

It is to be noted that a television signal processing device provided in a television set may include keyword detection means adapted to determine keywords from title information of actually received television programs. This has the advantage that the fields of interest of the user is derived from title information of actually received television programs selected by the user.

It is to be noted that the video recorder may also be adapted to automatically record television programs selected by the selection means as potentially of interest to the user on the magnetic tape 25 of the magnetic-tape cassette 26. Thus, it would be achieved that, for example, at night, the user can choose from a selection of television programs which have been recorded during the day and which are for the greater part of interest to him. This automatic recording of television programs which are of interest to the user can be used particularly advantageously in a recording arrangement, for example, a digital recording arrangement, having a very large memory—for example, a magnetic or an optical disc for the recording of television programs.

It is to be noted that the display means, formed by the television set 3 in the example of an embodiment as shown in FIG. 1, may also be formed by a display provided in a video recorder.

It is to be noted that it is not necessary to provide a television program memory for the storage of television program information determined by the television program information determining means. However, for determining television programs which are of interest to the user and which each have title information containing a given keyword, it is then, each time, necessary to carry out the television program information determining algorithm.

It is to be noted that an information detection stage may be adapted not only to detect teletext information TI formed by a teletext page number TSN for each receiving cycle of the information signal. It has proven to be advantageous if the information detection stage can be preset to at least two teletext page numbers TSN for detecting teletext information TI in each receiving cycle. In this respect, it has proven to be particularly advantageous if, in the television program information determining algorithm, the television program information determining means can preset the information detection stage to a teletext page number stored in a data block address memory and a teletext page number TSN of the received information signal, obtained from a preferential teletext page. This yields the advantage that television program information FPI can be derived in parallel from teletext information TI of two teletext pages, thus enabling television program information to be determined particularly rapidly.

It is to be noted that a television signal processing device in accordance with may, for example, also be provided in a television set. Such a television set may also be adapted to receive a digital television signal (DVB, DTTV).

It is to be noted that in order to enable an improved periodic erasure of keywords, it is also possible to store, for each keyword, the date of the last detection of this keyword in a keyword table.

It is to be noted that by means of automatically determined keywords, it is also possible to select teletext pages which are of interest to the user and which can be displayed in the teletext display mode.

The invention claimed is:

1. A recording arrangement comprising:
   receiving means for receiving a television signal and an information signal including television program information;
   recording means for recording a processed received television signal of a television program; and
   selection means for selecting at least one television program having title information contained in the television program information, said title information comprising at least one given keyword,
   characterized in that said recording arrangement further comprises:
      keyword detection means for detecting, as a detected keyword, at least one item of title fragment information of the title information of the television program recorded by the recording means as the processed received television signal, said keyword detection means providing said at least one detected keyword to the selection means as said at least one given keyword.

2. The recording arrangement as claimed in claim 1, characterized in that said recording arrangement further comprises a keyword memory for storing said at least one keyword detected by the keyword detection means.

3. The recording arrangement as claimed in claim 1, characterized in that said recording arrangement further comprises a television program memory for storing television program information derived from a received information signal.

4. The recording arrangement as claimed in claim 1, characterized in that said recording arrangement further comprises:
   display signal generating means, said display signal generating means being manually activatable for generating a display signal representing television program information of selected television programs;
   output means for applying the display signal to display means capable of displaying a list of recording suggestions containing television program information of at least one selected television program; and
   recording programming means for manually marking the television program information of one of the selected and displayed television programs, whereby the recording arrangement is programmable to record the marked television program.

5. The recording arrangement as claimed in claim 1, characterized in that the keyword detection means detects as keywords only title fragment information having a minimum number of characters.

6. The recording arrangement as claimed in claim 1, characterized in that said recording arrangement further comprises an exclusion memory for storing at least title fragment information which is to be excluded as a keyword by the keyword detection means.

7. The recording arrangement as claimed in claim 1, characterized in that the recording means automatically records a television program selected by the selection means.

8. The recording arrangement as claimed in claim 1, characterized in that the receiving means is capable of receiving an information signal from a computer data network.

* * * * *